United States Patent
Lüddecke et al.

(10) Patent No.: US 10,170,121 B2
(45) Date of Patent: Jan. 1, 2019

(54) SPEECH RECOGNITION SYSTEM AND METHOD FOR OPERATING A SPEECH RECOGNITION SYSTEM WITH A MOBILE UNIT AND AN EXTERNAL SERVER

(71) Applicant: VOLKSWAGEN AG, Wolfsburg (DE)

(72) Inventors: Daniel Lüddecke, Magdeburg (DE); Marius Spika, Braunschweig (DE); Eva Berner, Braunschweig (DE); Jens Schneider, Magdeburg (DE); Stephan Scholz, Meine (DE)

(73) Assignee: Volkswagen AG (DE)

( * ) Notice: Subject to any disclaimer, the term of this patent is extended or adjusted under 35 U.S.C. 154(b) by 91 days.

(21) Appl. No.: 15/183,932

(22) Filed: Jun. 16, 2016

(65) Prior Publication Data
US 2016/0372115 A1 Dec. 22, 2016

(30) Foreign Application Priority Data

Jun. 17, 2015 (DE) .......................... 10 2015 211 101

(51) Int. Cl.
| | |
|---|---|
| *G10L 15/00* | (2013.01) |
| *G10L 15/28* | (2013.01) |
| *G10L 15/30* | (2013.01) |
| *G10L 15/18* | (2013.01) |
| *G10L 15/065* | (2013.01) |
| *G10L 15/22* | (2006.01) |

(52) U.S. Cl.
CPC .............. *G10L 15/30* (2013.01); *G10L 15/00* (2013.01); *G10L 15/065* (2013.01); *G10L 15/18* (2013.01); *G10L 15/285* (2013.01); *G10L 2015/228* (2013.01)

(58) Field of Classification Search
CPC ....... G10L 15/00; G10L 15/30; G10L 15/063; G10L 15/065; G10L 15/285
See application file for complete search history.

(56) References Cited

U.S. PATENT DOCUMENTS

| | | | | |
|---|---|---|---|---|
| 6,195,641 B1 * | 2/2001 | Loring | ..................... | G10L 15/30 704/270 |
| 6,442,519 B1 * | 8/2002 | Kanevsky | ............... | G10L 15/07 704/243 |
| 6,741,963 B1 * | 5/2004 | Badt | ........................ | G10L 15/22 704/246 |
| 7,729,911 B2 * | 6/2010 | Chengalvarayan | ..... | G10L 15/20 704/226 |
| 7,809,562 B2 * | 10/2010 | Hanazawa | ............... | G10L 15/32 704/10 |
| 7,831,426 B2 | 11/2010 | Bennett | | |
| 7,870,142 B2 | 1/2011 | Michmerhuizen et al. | | |
| 8,005,680 B2 * | 8/2011 | Kommer | ................. | G06Q 30/02 379/88.01 |
| 8,219,384 B2 * | 7/2012 | Lloyd | ................... | G10L 15/065 704/246 |
| 8,255,217 B2 * | 8/2012 | Stent | ....................... | G10L 15/06 704/231 |
| 8,352,245 B1 * | 1/2013 | Lloyd | ................... | G10L 15/183 704/9 |
| 8,473,293 B1 * | 6/2013 | Mengibar | ............... | G10L 15/06 704/10 |
| 8,620,652 B2 * | 12/2013 | Chambers | ............... | G10L 15/22 704/231 |
| 8,880,403 B2 * | 11/2014 | Adams | .................... | G10L 15/19 704/235 |
| 9,190,057 B2 * | 11/2015 | Hoffmeister | ............ | G10L 15/32 |
| 9,626,962 B2 * | 4/2017 | Lee | ...................... | G10L 21/0208 |
| 9,633,653 B1 * | 4/2017 | Porter | ................. | G10L 15/1815 |
| 2009/0150156 A1 * | 6/2009 | Kennewick | ........ | G06Q 30/0261 704/257 |
| 2009/0228281 A1 * | 9/2009 | Singleton | ................ | G10L 15/08 704/275 |
| 2012/0059653 A1 * | 3/2012 | Adams | .................... | G10L 15/19 704/243 |

(Continued)

FOREIGN PATENT DOCUMENTS

| | | |
|---|---|---|
| DE | 19942869 A1 | 3/2001 |
| DE | 102006056286 A1 | 6/2008 |

(Continued)

OTHER PUBLICATIONS

Levandoski et al.; CareDB: A Context and Preference-Aware Location-Based Database System; Proceedings of the VLDB Endowment; 2010; vol. 3, No. 2; pp. 1529-1532.

(Continued)

*Primary Examiner* — Samuel G Neway
(74) *Attorney, Agent, or Firm* — Barnes & Thornburg LLP

(57) ABSTRACT

A voice recognition system having a mobile unit and an external server. The mobile unit includes a memory unit that stores voice model data having at least one expression set with expressions, a voice recognition unit, and a data interface that can set up a data-oriented connection to a data interface of the external server. The external server includes a database with event data having associated time data and expressions. The external server can, by comparing the time data associated with the event data with a current time, produce updated data that includes at least expressions associated with the event data of the database. The update data can be transmitted to the mobile unit. The update data can also be taken as a basis for adding the transmitted expressions to the expression set. Also disclosed is a method for operating a voice recognition system.

12 Claims, 1 Drawing Sheet

(56) References Cited

U.S. PATENT DOCUMENTS

2016/0019887 A1* 1/2016 Kim ................. G10L 15/08
 704/246
2016/0372115 A1* 12/2016 Luddeke ................ G10L 15/30

FOREIGN PATENT DOCUMENTS

| DE | 102009017177 A1 | 10/2009 |
| EP | 1168304 A1 | 1/2002 |
| EP | 2273491 A1 | 1/2011 |
| WO | 2011054324 A1 | 5/2011 |

OTHER PUBLICATIONS

Helmholz et al.; Context-Awareness in the Car: Prediction Evaluation and Usage of Route Trajectories; DESRIST; 2013; LNCS 7939; pp. 412-419.
MokbelL et al.: Toward Context and Preference-Aware Location-based Services; ACM MobiDE'09; 8th International ACM Workshop on Data Engineering for Wireless and Mobile Access; Jun. 29, 2009; pp. 25-32; Providence, Rhode Island, USA.

* cited by examiner

SPEECH RECOGNITION SYSTEM AND METHOD FOR OPERATING A SPEECH RECOGNITION SYSTEM WITH A MOBILE UNIT AND AN EXTERNAL SERVER

PRIORITY CLAIM

This patent application claims priority to German Patent Application No. 10 2015 211 101.6, filed 17 Jun. 2015, the disclosure of which is incorporated herein by reference in its entirety.

SUMMARY

Illustrative embodiments relate to a voice recognition system having a mobile unit and an external server. In this case, the mobile unit comprises a memory unit that stores voice model data that comprise at least one expression set with expressions. It further comprises a voice recognition unit that can take the voice model data as a basis for producing a recognized text for captured voice input data, and a data interface that can at least intermittently set up a data-oriented connection to a data interface of the external server. Illustrative embodiments further relate to a method for operating a voice recognition system having a mobile unit and an external server. In this case, a memory unit of the mobile unit stores voice model data that comprise at least one expression set with expressions. The voice model data can be taken as a basis for producing a recognized text for captured voice input data. In this case, a data-oriented connection to a data interface of the external server is set up at least intermittently.

BRIEF DESCRIPTION OF THE DRAWINGS

The disclosed embodiments will now be explained with reference to the drawings.

DETAILED DESCRIPTION

Figure 1:
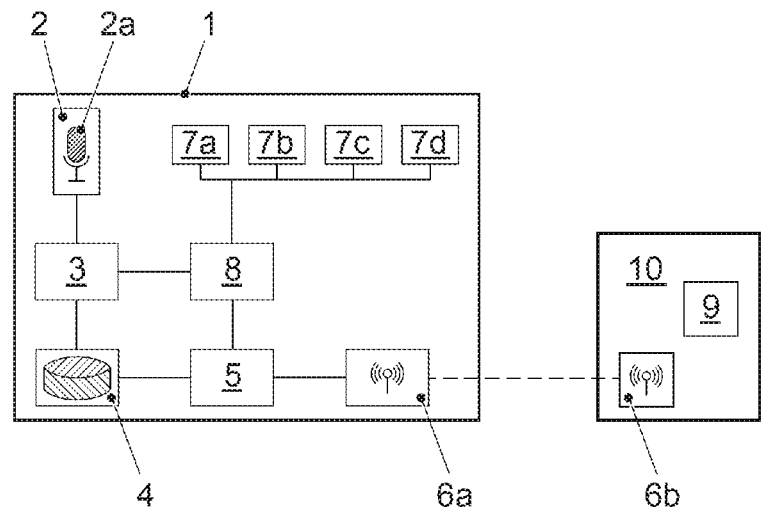
FIG. 1 shows an exemplary embodiment of the disclosed voice recognition system.

Disclosed embodiments relate to a voice recognition system having a mobile unit and an external server. In this case, the mobile unit comprises a memory unit that stores voice model data that comprise at least one expression set with expressions. It further comprises a voice recognition unit that can take the voice model data as a basis for producing a recognized text for captured voice input data, and a data interface that can at least intermittently set up a data-oriented connection to a data interface of the external server. Disclosed embodiments further relate to a method for operating a voice recognition system having a mobile unit and an external server. In this case, a memory unit of the mobile unit stores voice model data that comprise at least one expression set with expressions. The voice model data can be taken as a basis for producing a recognized text for captured voice input data. In this case, a data-oriented connection to a data interface of the external server is set up at least intermittently.

Voice recognition systems have a broad range of application for operator control systems. This relates in equal measure to the operator control of appliances and the accomplishment of tasks by telephone by means of a computer with a voice synthesizer, for example, telephone banking. Operator control of devices of a vehicle by means of voice inputs has also become established as an essential feature of current user interfaces in the vehicle. By way of example, complex issues are input by virtue of a voice dialog system sequentially requesting appropriate information from the user.

It is of crucial importance in this case that the recognition and interpretation of a voice input by the user takes place as accurately and quickly as possible. Although various methods have already been proposed for this, the high computation capacity that is required for implementation frequently hampers use, for example, in the field of mobile appliances or in vehicles. One approach to solving this problem is to relocate the computation tasks to a server that can be reached via the Internet.

However, this presupposes that the voice recognition system can interchange data with the server at all times, this not being assured at all times, particularly in areas with patchy coverage by mobile radio networks.

Various solutions have been proposed that are intended to provide for dynamic matching of the voice recognition system to the respective demands and thereby to improve voice recognition. It is possible for the scope of the voice inputs that can be recognized by the system to be extended.

In the case of the method described in WO 2011/054324 A1, existing structure data, for example, from the Internet, are taken as a basis for producing a grammar description and transmitting it to a voice recognition application.

DE 199 42 869 A1 describes a method in which a voice control system learns new voice patterns by means of adaptive transcription. By way of example, names of radio stations that are received by RDS (radio data system) are transcribed and stored, so that they can then be recognized as commands. New voice patterns can also be sent via the Internet.

In the case of the voice recognition arrangement in a vehicle proposed in DE 10 2009 017 177 A1, a voice command is transmitted to an off-board voice recognition system. A phonetic representation of the voice command and a meaning are ascertained off-board and transmitted to the on-board system. There, the phonetic representation and meaning of the voice command can be stored. The on-board system thus learns from the results of the off-board voice recognition.

The system for providing voice control for a navigation appliance described in EP 2 273 491 A1 provides for the voice recognition to take place on the basis of a dynamically generated grammar. In this case, the size of the grammar can be limited so as not to allow the demands on the system to become too great. Updates can be provided by a server, particularly on the basis of the geographical context of the voice input.

The disclosed embodiments provide a voice recognition system and a method for operating a voice recognition system that allow voice recognition to be performed reliably and in a resource-saving manner.

The disclosed voice recognition system of the aforementioned type is characterized in that the external server comprises a database with event data that have associated time data and expressions. The external server can produce, by comparing the time data associated with the event data with a current time, update data for the voice model data that comprise at least expressions associated with the event data of the database. These update data can be transmitted from the data interface of the server to the data interface of the mobile unit. The update data can be taken as a basis for adding the transmitted expressions to the expression set.

According to the disclosed embodiments, the words "expression set" denote the hoard of words and expressions that is available to the voice recognition unit for performing voice recognition. In this case, the term "expression" denotes particularly the representation of individual words, word groups and linguistic constructions, but also statistical correlations between the individual words or word groups. The sum total of the expressions forms the expression set. This is comprised by the voice model used that is used for voice recognition, the expression set being able to be augmented by further data in the voice model.

In addition to the mobile unit on which the actual voice recognition is performed, the disclosed embodiment provide for the external server that can update the voice model data of the mobile unit. In this case, expressions that are taken from a database of the server are added to the expression set. The expressions added in this manner are selected on the basis of time data that are linked to them. The database comprises particularly event data that have associated time data and expressions.

In this case, the event data refer to "events" that can comprise diverse data. They are intended to be understood to mean goings-on that can be placed in a temporal context. By way of example, an event may be a show, for example, a concert.

In this case, the time data can comprise the beginning and the end of the show. The event can be assigned expressions that relate to the event, such as the names of people taking part, titles of the pieces played, the name of the venue and terms that relate to the description of the show and, by way of example, describe a style of music. In another example, the event may be a sports event that has an associated time for the beginning and an associated time for the probable end. Further, expressions may have been assigned that relate to the sports event and the type of sport, for example, the names of the players and clubs taking part, the name of the ground, terms from the rules of the game and terms that are typical for describing the respective type of sport.

Events may further be taken from the news, for example. By way of example, the assigned expressions can relate to political goings-on, for example, the names of politicians or other people and institutions involved, places cited in the coverage or technical terms. In this case, the time data can correspond to the date of the coverage, for example.

An event is thus assigned times and/or periods, for example, a date on which an event takes place, or the duration of an event. Further, the event data have associated expressions that are relevant in connection with the respective event, for example. These expressions can comprise names and labels that are relevant to the event, for example, but also terms and expressions from the area with which the event is associated.

The addition of expressions that are in a temporal relationship with the update time can ensure that the expression set provides the most relevant expressions possible to ensure reliable voice recognition. The comparison of the time data that are associated with the event data with the current time can occur in different ways in this case: if the time data comprise a time, then the interval of time between this time and the update time can be determined. It is possible to determine whether the event is associated with a time coming before the update time. By way of example, the event may have taken place in the past and hence no longer be relevant. Further, the time data can comprise a period and it is possible to establish whether the update time is before, after or during the period. This also allows determination of whether the respective event is relevant and needs to be taken into account.

A threshold value may stipulate how far an event can be in the future and still be relevant, or whether past events are (still) relevant.

The expressions associated with the events can comprise different words and linguistic constructions whose occurrence is probable in connection with the respective event. By way of example, names of people involved, place names, points of interest and further expressions in connection with the event may be included. The added expressions therefore extend the expression set in a specific manner such that particularly good and reliable voice recognition is possible. The available resources are used efficiently, since the expression set does not have to cover all eventualities from the outset and its volume grows only by the relevant expressions added.

In at least one disclosed embodiment of the voice recognition system, the update data can further be taken as a basis for erasing a subset of expressions of the expression set. This allows the size of the expression set to be reduced. The size of the entire expression set can be kept essentially constant by adding one and erasing the other expression.

As the size of the expression set available for voice recognition increases, the demands on the computation capacity of the voice recognition system rise. Particularly in the case of mobile applications, this typically results in the difficulty that the available computation capacity is not sufficient for a large expression set. The volume of the expression set therefore needs to be limited.

According to the disclosed embodiments, expressions that are less relevant or not relevant can be removed from the expression set, in particular, the expressions to be erased being prescribed by the update data. By way of example, this allows the removal of such expressions as were relevant at an earlier time but that, e.g., are associated with an event that is in the past.

The update data can thus specify both expressions that need to be erased from the expression set and expressions that need to be added. The simultaneous addition and erasure of expressions during an update thus allows excessive growth of the expression set to be avoided. The reliability and reaction speed of the voice recognition system can be optimized as a result.

The update can also comprise a general update for the expression set, with not only the expressions determined according to the disclosed embodiments in connection with the time data but also other expressions being able to be added or removed. The update is in this case considered to be an event that is to be performed at a particular time. This allows efficient performance of updates for the system.

In one development, the transmitted expressions further comprise time data associated with the event data. As a result, it is possible to determine what times or periods have the respective expressions associated with them.

This makes it possible to establish, even without accessing the server, whether particular expressions are still current, i.e., at what distance of time they are from the current time. By way of example, this can prompt the removal of expressions that relate to an event in the past.

In a further refinement, the mobile unit further comprises an update unit that can be used to produce status data about the voice model data and to transmit the status data to the external server. The status data comprise information about foregone changes in the expression set by means of update data of the server and/or about the current volume of the expression set. The update data can further be produced on the basis of the status data. As a result, it is possible to notify the server, when the update data are produced, of the nature of the expression set for the update, for example, which and how many expressions the update set comprises.

It is thereby possible to determine how long ago the last update was. This facilitates determination of the expressions that need to be added or removed to bring the system up-to-date. Further, the size of the current expression set can be taken as a basis for determining whether enlargement through further addition of expressions needs to be performed or whether the number of expressions needs to be reduced.

In one form, a context capture unit of the mobile unit can capture context data and transmit the context data to the external server. Subsequently, the update data are produced on the basis of the context data. This allows determination of the expressions that are to be added or to be erased with a particularly high degree of relevance.

In this case, the context data can relate particularly to the user, the mobile unit and the surroundings of the mobile unit. It is thus possible to capture an identification for the user and/or for the mobile unit, for example. This allows individualized updates for the voice recognition system, with particular settings, preferences and habits of the user being able to be taken into account. Further, properties of the user, for example, personal data such as age, sex and origin, can permit improved predictions of what expressions are relevant to the user. By way of example, the context data about the mobile unit can comprise what devices and applications are activated or available. In this way, it is possible for the update data to be coordinated with what further applications are available to the mobile unit.

The context data about the surroundings of the mobile unit can be determined on the basis of the geographical position of the mobile unit, for example, but also by a sensor system that delivers data about the surroundings, for example. It is thus possible, by way of example, for the proximity of other mobile units to be determined on the basis of signal transmissions at short range.

In one form, the context data can be captured by further devices, particularly by a navigation appliance and/or an electronic diary. As a result, there is a high probability of being able to determine whether particular expressions and events are relevant.

By way of example, the context data captured by the navigation appliance can comprise the current position of the mobile unit, a scheduled destination for a route or geographical information about the surroundings of the mobile unit. An electronic diary can also capture event data with time data that are particularly associated with the user. By way of example, the place and the time of an imminent appointment can be captured and the update data can then be produced such that expressions of the expression set that are relevant for this appointment are added. Conversely, expressions that were relevant for a past appointment can be removed, for example.

In one form, the event data of the database further have associated geographical position data. A position finding unit can be used to determine a current position of the mobile unit and to transmit it to the external server. The update data are further produced by comparing the geographical position data associated with the event data with the position.

This further allows the relevance of the events to be determined more accurately on the basis of the position of the mobile unit, particularly in conjunction with context data from a navigation appliance. However, determination can also be effected on the basis of other methods, for example, by means of a radio link to fixed-location stations at a known position or on the basis of inputs by the user.

Events whose geographical position data do not exceed a prescribed maximum distance from the position of the mobile unit can be identified as relevant. It can be assumed that events at a great physical distance from the user are less relevant than events close by. Conversely, the physical proximity between the mobile unit and an event can be taken as a basis for inferring that expressions that are relevant for the event have a high probability of being used and need to be recognized. By way of example, a high relevance for a concert can be determined if it is taking place in proximity to the user, whereas a sports event at a great distance is not classified as relevant.

In a further form, instead of the current position of the mobile unit, it is also possible for a position in the past to be transmitted to the external server. In this way, event data that are relevant in hindsight can be identified as relevant, for example, to allow the user to make an input relevant to a past event.

Further, instead of the current position of the mobile unit, it is also possible for a position that will be reached in the future to be transmitted to the external server, for example, the destination for a route that is currently active in the navigation system. This particularly allows voice inputs relating to an event to which the user is currently on his way to be recognized.

In one development, the voice recognition unit can further capture statistical data for the captured voice input data and transmit the statistical data to the server.

The update data can then be produced by the server on the basis of the statistical data. This allows a high level of personalization for the voice recognition system.

It is possible to determine the frequency with which a user has used particular expressions in past voice inputs. Frequently used expressions can indicate that the expression also has a high probability of being used in the future. Conversely, little used expressions can signify low relevance. It is thereby possible to ensure that rarely used or unused expressions are removed from the expression set, while frequently used expressions are not removed and/or other, for example, related expressions can be added.

Besides a statistical analysis, it is also possible to use machine learning methods to identify important words and to determine irrelevant words for erasure.

In one form, the mobile unit is arranged in a vehicle. In this case, the user may particularly be the driver of the vehicle. This allows devices of the vehicle to be controlled by means of voice control.

In this case, the voice recognition system may have access to the data of other devices arranged in the vehicle. Reliable and fast operation of a voice recognition system is therefore of particular importance in vehicles because the driver of the vehicle needs to be distracted from the traffic scenario as little as possible. In addition, the movement of the vehicle means that it is necessary to take into account that the relevance of individual expressions can change on the basis of geographical position and time. Given the limited performance of the computation systems embedded in the vehicle, this means that the expression set needs to be repeatedly updated if the volume of the expression set is not to become too large.

In the method disclosed above, the external server comprises a database with event data that have associated time data and expressions. The external server produces, by comparing the time data associated with the event data with the current time, update data for the voice model data that comprise at least expressions associated with the event data of the database, and transmits the update data to the mobile unit.

The update data are subsequently taken as a basis for adding the transmitted expressions to the expression set. The disclosed method is used particularly for operating the disclosed voice recognition system. It therefore has the same benefits as the disclosed voice recognition system.

In at least one disclosed embodiment, the update data are further taken as a basis for erasing a subset of expressions of the expression set. This allows the volume of the expression set to be reduced.

An exemplary embodiment of the disclosed voice recognition system will be explained with reference to FIG. 1.

The voice recognition system comprises a mobile unit 1 and an external server 10. The mobile unit 1 comprises a voice capture unit 2 having a microphone 2a. In the exemplary embodiment shown, the user can signal the beginning of a voice input by pushing a push-to-talk switch (PTT), whereupon the voice capture unit 2 captures and records the voice input data spoken by the user. Buffer-storage is performed, so that the voice input data are available for a further use.

The voice capture unit 2 has a voice recognition unit 3 coupled to it. The latter can take the captured voice input data as a basis for producing a recognized machine-readable text. This is accomplished by using voice model data SM that are stored on a memory unit 4. In this case, the voice model data SM comprise at least one expression set $A_i$ containing expressions. The expressions of the expression set $A_i$ particularly describe a hoard of words and expressions that is used for recognizing the text. The sum total of the voice model data SM is used as a voice model for voice recognition.

The mobile unit 1 further comprises an update unit 5 that is coupled to a data interface 6a of the mobile unit. The mobile unit 1 further comprises a context capture unit 8 that, in the case shown, is coupled to the voice recognition unit 3, the update unit 5 and four further devices 7a to 7d. One of the devices 7a to 7d is a navigation appliance, and another device is an electronic diary.

The data interface 6a of the mobile unit 1 can be used to at least intermittently set up a data-oriented connection to the data interface 6b of the external server 10. The external server 10 comprises a database 9. The data-oriented connection can be effected wirelessly, for example, by a local area network or a larger network, for example, the Internet. Further, the connection can be set up via a telecommunication network, for example, a telephone network, or a wireless local area network (WLAN). Further, the data link can be effected by connecting a data cable. The connection can also be set up via another unit, which itself is able to set up a connection to the external server 10. By way of example, there may be a data-oriented connection between the mobile unit 1 and a mobile telephone connected to the Internet, for example, by means of a data cable or a radio link, for example, by Bluetooth. The connection to the external server 10 is set up via the Internet.

Figure 2:
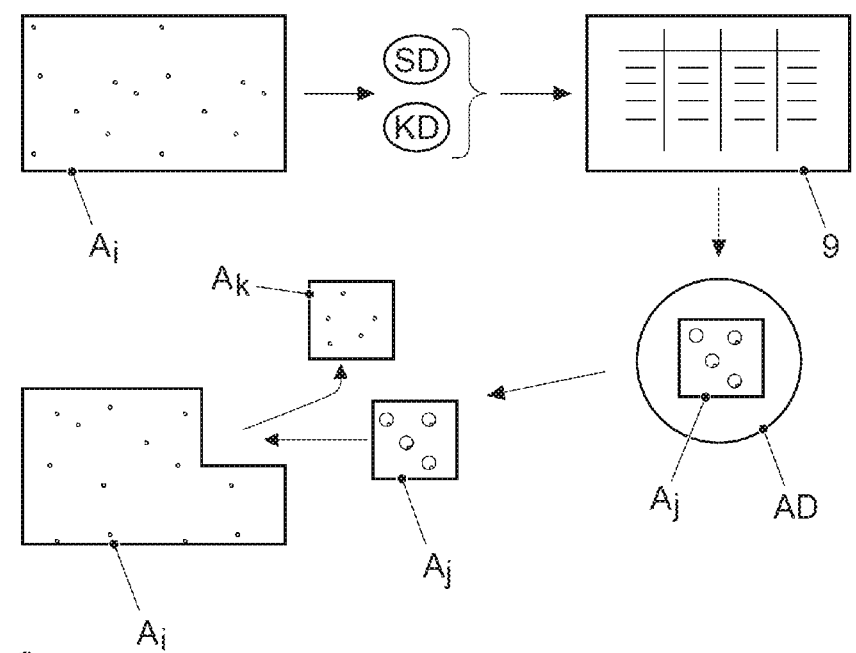
FIG. 2 shows an exemplary embodiment of the disclosed method.

An exemplary embodiment of the disclosed method will be explained with reference to FIGS. 1 and 2.

As already explained above, the memory unit 4 stores voice model data SM that comprise an expression set $A_i$. The data interfaces 6a and 6b of the mobile unit 1 and the server 10 are used to set up a data-oriented connection, so that the voice model data SM can be updated. To this end, the update unit 5 produces status data SD about the voice model data SM. The status data SD particularly comprise information about the time at which the last update for the voice model data SM was performed, how large the expression set $A_i$ is and what the maximum desired size of the expression set $A_i$ is.

Further, the context capture unit 8 captures context data KD, wherein particularly data from the other devices 7a to 7d are captured.

The context data KD comprise, inter alia, the geographical position of the mobile unit 1, a route that is currently output by the navigation system and geographical information about the surroundings. Further, the context data KD comprise data from a diary, particularly times, geographical positions and descriptive texts for upcoming appointments. The context data KD further comprise statistical data about how frequently individual expressions from the expression set $A_i$ have been used for past voice inputs. The expressions from the expression set $A_i$ that have been used particularly frequently or particularly rarely are included.

The status data SD and the context data KD are transmitted to the server 10. The latter comprises the database 9 with event data. Data records correspond to individual events. The event data have associated time data, for example, the time of a future event and/or the duration of the event. The event data further have associated expressions. These are particularly expressions that are particularly relevant for voice inputs in connection with the respective result.

In the example shown, one of the events is a concert that is mentioned in the diary of the user and for which additional information is available on the server. In this case, the time data comprise the beginning and end of the concert. The concert will be assigned expressions such as the name of the performer, the titles of the pieces played and of other pieces, the venue and terms that are typically used in a description of music, particularly for the style of music.

Further, by way of example, a sports event is included that has an associated time for the beginning and an associated time for the probable end. Further, there are associated expressions that relate to the sports event and the type of sport, such as the names of players and clubs, grounds, rules of the game and terms that are typical for describing the respective type of sport.

Events are further taken from the news. In this case, the associated expressions relate to political goings-on, for example, such as the names of politicians, places cited in the coverage or technical terms. In this case, the time data correspond to the date of the coverage, and an "expiry date" is determined, after which the event is interpreted as less or no longer relevant.

Update data AD are then produced. These comprise at least expressions $A_j$ that are associated with events in the database. In the case of the example shown, this involves the current time, i.e., the time of the update, being taken as a basis for considering as relevant any event whose time data reveal that the event is still current, and for which the geographical position data is not too far away from the current position of the mobile unit 1 or from the designation position at the end of the route determined by the navigation appliance. Such events as are in the future or as have an as yet unended term are considered. In the case of events for which such a term cannot be defined clearly, for example, for the information from the news, a defined interval of time, for example, beginning with the time of the coverage of the event, is determined as the term.

The update data AD further comprise information about which expressions $A_k$ need to be erased from the expression set $A_i$. By way of example, this may be the set of expressions that were added for an earlier update and that are no longer current. Further, these may be rarely used or unused expressions, for example. The update data AD are transmitted from the server 10 to the mobile unit 1. The update unit 5 takes the update data AD as a basis for making changes to the voice model data SM, with particularly a subset $A_k$ of the expression set $A_i$ being erased while the expressions $A_j$ are added afresh. The volume of the expression set $A_i$ remains essentially constant in this case.

In a further exemplary embodiment, the mobile unit 1 is arranged in a vehicle. In this case, the devices 7a to 7d are be further devices of the vehicle, including various driver assistance systems, the navigation system, an infotainment system and sensors of the vehicle. As a result, particularly the context capture unit 8 can determine the context data KD more specifically, which means that the update data AD are produced with greater accuracy for the respective situation.

The voice recognition system in the vehicle can be used to capture voice inputs by the user for controlling devices 7a to 7d of the vehicle, for example, the navigation appliance. The update data AD are determined such that the expression set $A_i$ allows reliable and fast voice recognition in connection with points of interest in the surroundings of a scheduled route.

LIST OF REFERENCE SYMBOLS

1 Mobile unit
2 Voice capture unit
2a Microphone
3 Voice recognition unit
4 Memory unit
5 Update unit
6a Data interface of the mobile unit
6b Data interface of the external server
7a, 7b, 7c, 7d Devices
8 Context capture unit
9 Database
10 External server
$A_i$ Expression set
$A_j$ Expressions in the database
$A_k$ Expressions to be erased
AD Update data
KD Context data
SD Status data
SM Voice model data

The invention claimed is:

1. A transportation vehicle user interface voice recognition system comprising:
a mobile unit provided on a transportation vehicle; and
an external server, wherein the mobile unit and the external server are in communication with each other, wherein the mobile unit comprises;
a memory that stores voice model data that comprise at least one expression set with expressions for controlling transportation vehicle functionality using voice input of a user;
a voice recognition unit configured to use the voice model data as a basis for producing a recognized text for captured voice input data generated based on the voice input of the user, wherein the recognized text is analyzed to determine how to control the transportation vehicle functionality; and
a data interface that at least intermittently sets up a data-oriented connection to a data interface of the external server,
wherein the external server comprises:
a database with event data having associated time data and expressions for controlling transportation vehicle functionality, the external server being configured to produce update data for the voice model data stored in the memory of the mobile unit by comparing the time data associated with the event data with a current time,
wherein the update data for the voice model data comprises at least expressions associated with the event data in the external server database,
wherein the external server is further configured to transmit the update data from the external server to the data interface of the mobile unit,
wherein the transmitted expressions are added to the stored at least one expression set based on the update data and a subset of expressions of the at least one expression set stored in the memory are erased from the memory based on the update data, and
wherein the event data of the database further have associated geographical position data, wherein the voice recognition system further includes a position finding unit configured to determine a current position of the mobile unit, wherein position finding unit is configured to transmit the current mobile unit's position to the external server, and wherein the update data are further produced by the external server by comparing the geographical position data associated with the event data with the mobile unit's position.

2. The transportation vehicle user interface voice recognition system of claim 1, wherein the transmitted update data further comprise time data associated with the event data.

3. The transportation vehicle user interface voice recognition system of claim 1, wherein the mobile unit further comprises an update unit configured to produce status data about the voice model data stored in the memory and to transmit the status data to the external server, wherein the status data comprise information about at least one foregone change in the update data sent from the external server and/or about a current volume of the expression set stored in the memory, and wherein the update data are subsequently produced by the external server based on the status data sent from the update unit of the mobile unit to the external server.

4. The transportation vehicle user interface voice recognition system of claim 1, wherein the mobile unit further comprises a context capture unit configured to capture context data and transmit the context data to the external server, wherein the update data are subsequently produced by the external server based on the context data sent from the update unit of the mobile unit to the external server.

5. The transportation vehicle user interface voice recognition system of claim 4, wherein the context data includes data indicating a geographical position of the mobile unit, a route that is currently output by a navigation system of the transportation vehicle, geographical information about transportation vehicle surroundings, and/or diary data indicating time, geographical position and/or descriptive text for at least one upcoming appointment.

6. The transportation vehicle user interface voice recognition system of claim 1, wherein the voice recognition unit is further configured to capture statistical data about the captured voice input data and transmit the statistical data to the external server, and wherein the update data is produced by the external server based on the statistical data.

7. A method for operating a transportation vehicle user interface voice recognition system having a mobile unit and an external server, the method comprising:

storing voice model data that comprise at least one expression set with expressions in a memory of the mobile unit, wherein the expressions are for controlling transportation vehicle functionality using voice input of a user;

producing a recognized text for captured voice input data based on the voice model data, wherein the recognized text is analyzed to determine how to control the transportation vehicle functionality;

setting up a data-oriented connection to a data interface of the external server at least intermittently, wherein the external server comprises a database with event data that have associated time data and expressions for controlling transportation vehicle functionality;

producing, by the external server, update data for the voice model data by comparing the time data associated with the event data with a current time, wherein the update data for the voice model data comprises at least expressions associated with the event data of the database;

transmitting, by the external server, the update data to the mobile unit; and adding the transmitted expressions to the expression set based on the update data and erasing a subset of expressions of the at least one expression set from the memory based on the update data, wherein the event data of the database include associated geographical position data, wherein the voice recognition system further includes a position finding unit and the method further comprises the position finding unit determining and transmitting a current position of the mobile unit to the external server, and comparing the geographical position data associated with the event data with the mobile unit's position by the external server as part of producing the update data.

8. The method of claim 7, wherein the update data further comprise time data associated with the event data.

9. The method of claim 7, wherein the mobile unit further comprises an update unit configured to produce status data about the voice model data stored in the memory and to transmit the status data to the external server, wherein the status data comprise information about at least one foregone change in the update data sent from sent from the server and/or about a current volume of the expression set stored in the memory, and wherein the update data are subsequently produced by the external server based on the status data sent from the update unit of the mobile unit to the external server.

10. The method of claim 7, wherein the mobile unit includes a context capture unit and the method further comprises capturing and transmitting context data, by the context capture unit, to the external server, and subsequent to the transmission of the context data, producing the update data, by the external server, based on the context data sent from the update unit of the mobile unit to the external server.

11. The method of claim 10, wherein the context data is includes data indicating a geographical position of the mobile unit, a route that is currently output by a navigation system of the transportation vehicle, geographical information about transportation vehicle surroundings, and/or diary data indicating time, geographical position and/or descriptive text for at least one upcoming appointment.

12. The method of claim 7, further comprising, the voice recognition unit capturing statistical data about the captured voice input data and transmitting the statistical data to the external server, and producing, by the external server, the updated data by the external server based at least in part on the statistical data.

* * * * *